United States Patent [19]

Hodgkins et al.

[11] 4,335,216

[45] Jun. 15, 1982

[54] LOW TEMPERATURE FIRED DIELECTRIC CERAMIC COMPOSITION AND METHOD OF MAKING SAME

[75] Inventors: Charles E. Hodgkins, Lewiston; Mark J. Giermek, Tonawanda, both of N.Y.

[73] Assignee: TAM Ceramics, Inc., Niagara Falls, N.Y.

[21] Appl. No.: 259,520

[22] Filed: May 1, 1981

[51] Int. Cl.$^3$ .................. C04B 35/00; C04B 35/46
[52] U.S. Cl. ........................... 501/32; 501/138
[58] Field of Search ................ 501/32, 137, 138

[56] References Cited

U.S. PATENT DOCUMENTS

| | | | |
|---|---|---|---|
| 3,682,766 | 8/1972 | Maher | 501/152 |
| 3,885,941 | 5/1975 | Maher | 501/137 |
| 4,058,404 | 11/1977 | Fujiwara et al. | 501/137 |
| 4,066,426 | 1/1978 | Maher | 501/138 |
| 4,082,906 | 4/1978 | Amin et al. | 501/137 |

Primary Examiner—Mark Bell
Attorney, Agent, or Firm—Edward J. Handler, III; Alan T. Bowes; Lynne Darcy

[57] ABSTRACT

Low temperature fired dielectric ceramic compositions are prepared by firing, at temperatures between about 1000° C. and about 1150° C., a base ceramic preparation comprising barium titanate, strontium titanate, barium zirconate, titanium dioxide and manganese dioxide mixed with a glass frit comprising zinc oxide, silicon dioxide, boron oxide, lead oxide, bismuth tioxide, and cadmium oxide. The resulting dielectric ceramic composition is useful to form multilayer ceramic capacitors.

14 Claims, No Drawings

LOW TEMPERATURE FIRED DIELECTRIC CERAMIC COMPOSITION AND METHOD OF MAKING SAME

BACKGROUND OF THE INVENTION

The present invention relates to a low temperature fired dielectric ceramic composition, and a method of making same. More specifically, it relates to a dielectric ceramic composition formed by firing a mixture of a base ceramic preparation comprising a mixture of dielectric oxides and a glass frit at temperatures not exceeding 1150° C.

Multilayer ceramic capacitors are commonly made by casting or otherwise forming insulating layers of dielectric ceramic powder, placing thereupon conducting metal electrode layers, usually in the form of a metallic paste, stacking the resulting elements to form the multilayer capacitor, and firing to densify the material and form a solid solution of the constituent dielectric oxides. Barium titanate is one of the dielectric oxides frequently used in the formation of the insulating ceramic layer. Because of the high Curie temperature of barium titanate, however, strontium and zirconium oxides are commonly reacted with the barium titanate to form a solid solution, thereby reducing the Curie temperature of the resulting ceramic material. Certain other oxides, such as manganese dioxide, may also be added to control the dielectric constant of the resulting material by acting as a grain growth control additive.

Because the materials commonly used to produce ceramic capacitors with dielectric constants greater than 4500 are generally fired to maturity in air at temperatures greater than 1150° C., the metallic electrode layer must be formed from the less reactive, higher melting alloys of the so-called precious metals, such as palladium and silver, palladium and gold, and other similarly expensive alloys well-known in the art. This is necessary in order to prevent either reaction of the electrode with the insulating ceramic layer or melting which might result in discontinuities in the conducting layer. A method of producing a ceramic composition with a high dielectric constant and other suitable properties, which can be fired at temperatures below 1150° C., would permit the use of a less costly electrode material without sacrificing capacitor performance.

In the prior art methods for producing a low temperature fired dielectric ceramic composition, as set forth, e.g., in U.S. Pat. Nos. 3,682,766, 3,885,941 and 4,066,426, a base ceramic preparation of dielectric oxides is completely presintered to form a solid solution at a high temperature, ground to a fine powder, and mixed with glass frit. This ceramic-glass mixture can be fired at a substantially lower temperature than the base ceramic preparation alone, thus permitting the use of lower melting materials, e.g., pure silver or silver-palladium alloys having a substantially higher percentage of silver than the higher melting alloys previously used for the conductive metal layers. A major disadvantage of the prior art methods for making a low temperature fired ceramic capacitors, however, is the necessity for presintering the base ceramic preparation at a high temperature to form a solid solution of the constituent oxides before mixing with the glass frit. Another disadvantage of the prior art is the large volume of glass frit necessary to achieve the low firing materials.

Therefore, it is an object of the present invention to produce a ceramic composition with high dielectric constant capable of being fired at temperatures below 1150° C. Another object of this invention is to produce a low temperature fired, high dielectric constant ceramic composition whose dielectric constant varies predictably with temperature. Still another object of this invention is the provision of a process for preparing a dielectric ceramic composition with high dielectric constant which eliminates the necessity for a presintering step at a temperature of greater than 1150° C.

SUMMARY OF THE INVENTION

The above stated objects and other objects are achieved by the present invention, which is directed to a low temperature fired dielectric ceramic composition formed from two components, i.e., a major component comprising a base ceramic composition, and a minor component comprising a glass frit. More specifically, in forming the dielectric ceramic composition of the invention the major component comprises from about 92 to about 96.5 percent by weight of the dielectric ceramic composition while the minor component comprises from about 3.5 to about 8 percent by weight of the composition.

The major component of the ceramic composition is a base ceramic preparation of dielectric oxides comprising barium titanate, strontium titanate, barium zirconate, titanium dioxide and manganese dioxide, or their constituent oxides or oxide precursors. The compositional ranges of the components of the base ceramic preparation, expressed as the oxides, are barium titanate from about 72 to about 80 weight percent, strontium titanate from about 6 to about 15 weight percent, barium zirconate from about 6 to about 15 percent, titanium dioxide from about 0.4 to about 0.8 percent, and manganese dioxide from about 0.1 to about 0.4 weight percent. The combined weight percent of strontium titanate and barium zirconate is about 20 to about 28 percent by weight.

The glass frit minor component comprises zinc oxide, silicon dioxide, boron oxide, lead oxide, bismuth trioxide and cadmium oxide. The compositional ranges of the components of the glass frit are zinc oxide from about 5 to about 10 weight percent, silicon dioxide from about 5 to about 10 weight percent, boron oxide from about 9 to about 15 weight percent, lead oxide from about 35 to about 45 weight percent, bismuth trioxide from about 15 to about 25 weight percent and cadmium oxide from about 10 to about 19 weight percent.

In the preferred embodiment, the base ceramic preparation comprises from about 93 to about 96 percent and the glass frit comprises from about 4 to about 7 percent of the total weight of the dielectric ceramic composition, with a composition comprising about 95.5 weight percent base ceramic preparation and about 4.5 weight percent glass frit being especially preferred.

The preferred proportions of the components of the base ceramic preparation, expressed as the oxides, are barium titanate from about 74 to about 76 weight percent, and especially 74.5 weight percent; strontium titanate from about 12 to about 13 weight percent, and especially about 12.7 weight percent; barium zirconate from about 11.5 to about 12.5 weight percent, and especially about 12 weight percent; titanium dioxide from about 0.5 to about 0.7 weight percent, and especially about 0.6 weight percent; and manganese dioxide from about 0.1 to about 0.3 weight percent, and especially about 0.2 weight percent.

The preferred proportions for the components of the glass frit are zinc oxide from about 7 to about 8 weight percent, and especially about 7.4 weight percent; silicon dioxide from about 7.5 to about 8.5 weight percent, and especially about 7.9 weight percent; boron oxide from about 13 to about 14 weight percent, and especially about 13.6 weight percent; lead oxide from about 39 to about 40 weight percent, and especially about 39.5 weight percent; bismuth trioxide from about 15.5 to about 16.5 weight percent, and especially about 15.8 weight percent; and cadmium oxide from about 15.5 to about 16.5 weight percent, and especially about 15.8 weight percent.

The preferred ceramic compositions of this invention, when formed into multilayer capacitors, have dielectric constants which are typically about 5400, with dissipation factors which are typically about 1.8% at 1.0 Vrms and 1.2% at 0.5 Vrms. In addition, the dielectric constants of these preferred ceramic compositions decrease only about 48% as the temperature decreases from 25° C. to −30° C. and decrease only about 54% as the temperature increases from 25° C. to 85% C.

The method of making the dielectric ceramic composition of this invention comprises the steps of mixing the constituent refractory oxides of the basic ceramic preparation, milling together the appropriate proportions of the constituents of the base ceramic preparation and the glass frit, and firing the resultant mixture at a temperature between about 1000° C. and about 1150° C.

DETAILED DESCRIPTION OF THE INVENTION

As set forth below, the dielectric ceramic composition of the present invention has several advantages which result in a substantial cost savings without sacrificing desirable physical and electrical properties.

The present invention provides a novel method for preparing a low temperature fired dielectric ceramic composition with improved properties. More particularly, the method of the present invention allows the formation of the dielectric ceramic composition by the direct mixing and firing of the constituents of the base ceramic preparation with the glass frit without presintering the base ceramic preparation at a high temperature to form the complex metal oxide. This procedure differs substantially from that disclosed in the prior art set forth above, which calls for solid solutions of the constituent dielectric oxides to be fully reacted at high temperatures and pulverized before mixing with the glass frit. In view of the energy saving in eliminating the presintering step and the difficulty of pulverizing the resulting sintered mass, it can be seen that the method of the invention results in a substantial saving in processing costs.

The fired ceramic body of the present invention is produced by reacting during the course of firing the constituent dielectric oxides of the base ceramic preparation, including barium oxide, titanium dioxide, strontium oxide, zirconium dioxide, and manganese dioxide, with a small amount of glass frit which comprises zinc oxide, silicon dioxide, boron oxide, lead oxide, bismuth trioxide, and cadmium oxide. The oxides of the base ceramic preparation may be included as the titanates, zirconates or other combined forms. For example, barium oxide and titanium dioxide may be reacted to form barium titanate. The combined oxides may also be formed from any reaction which will produce them, e.g., the calcining of an oxide precursor, such as a carbonate or nitrate, with other constituent oxides or their precursors. As is well known in the art, commercial preparations of barium titanate, strontium titanate, barium zirconate and the like come in various grades, and the proportions of the constituents of the base ceramic preparation may therefore require slight adjustment using known experimental methods in order to achieve the desired properties.

The base ceramic preparation may be heat treated at a temperature between about 900° C. and about 960° C. prior to mixing with the glass frit in order to drive off volatiles, break down any oxide precursors, and densify the individual grains, thus slightly densifying the resultant material and controlling the surface area and size of the particles. Heat treatment also allows the manganese ions to diffuse throughout the preparation. Although a low temperature fired ceramic with basically the same characteristics may be prepared without heat treating, heat treatment before mixing with the glass frit may be necessary if oxide precursors are used in substantial amounts.

Prior to mixing with the base ceramic preparation, the admixture of the oxides comprising the glass frit is melted, fritted in cold water, and reground. The density of the glass frit of the invention is about 5.4 g/cm$^3$. Although the surface area and the particle size of the particles of the reground glass frit are not critical, the surface area should be between about 1 meter squared/gram (m$^2$/g) and about 4 m$^2$/g, and preferably about 2.5 m$^2$/g, and the size of the particles should be between about 0.8 microns and about 2.5 microns in effective diameter, and preferably about 1.3 microns. These values are about the same as the values for the density, surface area and particle size of the base ceramic preparation.

In accordance with the present invention, even though the discrete particles of the dielectric constituents of the base ceramic preparation have not been presintered to form a solid solution, densification occurs when the glass frit particles are mixed with the base ceramic preparation powder and the blended powders are compacted or formed into multilayer capacitors and heated to the liquidus of the glass phase of the frit material. Because the compressive forces of densification are highest at the points of contact between the discrete particles of the dielectric constituents, dissolution at the solution-solid interface results in the diffusion of ions through the liquid phase to form a solid solution of the oxide constituents of the base ceramic preparation without the necessity for presintering to form the solid solution at elevated temperatures, i.e., 1300° C. to 1500° C. The densification, sintering and solid solution formation according to the present invention take place at temperatures between about 1000° C. and about 1150° C. The preferred firing temperature is about 1093° C. The firing time is between about 60 minutes and about 150 minutes and is preferably about 120 minutes.

The lower firing temperature of the ceramic composition of the invention permits the use of silver-palladium electrodes which have a 70% silver and only 30% palladium content as the conducting layers in multilayer capacitors. This is desirable because palladium, a precious metal, is considerably more expensive than silver. Although 100% silver electrodes would be even more desirable economically, firing temperatures below about 960° C. are necessary in order to use 100% silver electrodes. These lower temperatures, however, require the presence of increased amounts of glass frit, which unfortunately results in a reduction of the dielectric constant of the fired material. The especially preferred embodiment of the present invention calls for a frit content of about 6% by weight, which, upon firing at about 1093° C., results in a ceramic composition with a dielectric constant of between about 4800 and about 5800, preferably greater than 5000 and typically about 5400. Electrodes comprising an alloy of about 70% silver and about 30% palladium can conveniently be used in the temperature range between 1000° C. and 1150° C., achieving a substantial cost saving over the electrodes with high palladium content previously required for materials which were fired at higher temperatures, while producing a material with high dielectric constant and electrical properties suitable for use in ceramic capacitors.

In the present invention, the proportions of constituent oxides of the base ceramic preparation are chosen to maximize the desired physical and electrical properties. Since the dielectric constant of a ceramic material is highest at its Curie temperature, a material with a Curie temperature as close as possible to room temperature is preferred. Further, because the addition of the glass frit to the base ceramic preparation substantially lowers the dielectric constant of the resulting dielectric ceramic composition, it is desirable to maximize the dielectric constant of the base ceramic preparation at the outset.

Barium titanate has a very high dielectric constant, but also a high Curie temperature. Both barium zirconate and strontium titanate, if reacted to form a solid solution with barium titanate, will cause the Curie temperature of the resultant complex oxide to shift downward toward room temperature. Although barium zirconate causes a greater downward shift than strontium titanate, strontium titanate helps to maintain the very high dielectric constant of the material. With these considerations in mind, the present invention provides that when the proportion of barium titanate is increased in the base ceramic preparation, the proportion of barium zirconate should also be increased, while the proportion of strontium titanate should be decreased.

Reasonably large grains of uniform size are also an important factor in achieving a high dielectric constant in a ceramic material. For this reason, titanium dioxide is added to the base ceramic preparation of the present invention in an amount such that the resultant complex oxide of the base ceramic preparation is non-stoichiometric in order to promote grain growth. Manganese dioxide is included in the base ceramic preparation as a grain growth control additive to encourage the growth of grains of uniform size and prevent the growth of excessively large grains which result in a lowered dielectric constant. The grain size of the dielectric ceramic composition of the invention is between about 3 and about 6 microns in effective diameter. Manganese dioxide also serves as an acceptor ion, compensating free donor ions. The base ceramic preparation resulting from the combination of the above constituents has a very high dielectric constant of about 11,000 and a Curie point around room temperature, i.e., between about 19° C. and about 50° C.

In preparing the base ceramic preparation used in the invention, the constituent oxides in the proportions set forth above may be slurried together in water. The manganese dioxide may be added to the slurry in the form of a precursor, e.g., a manganous nitrate solution, which will decompose to manganese dioxide upon firing. After drying, the mixture may be heat treated as set forth above, dry blended with the glass frit composition, cast into a sheet using standard methods, formed into a multilayer capacitor structure with 70% silver—30% palladium electrodes, and fired at about 1093° C. for about two hours.

The low temperature fired dielectric composition of this invention has an insulation resistance (IR) at 25° C. of between about 5000 and about 7000 ohm-farads, and typically about 5500 ohm-farads, for a one minute charge at 100 volts D.C. At 85° C., the insulation resistance is between about 2000 and about 3000 ohm-farads for a one minute charge at 100 volts, with a typical value of about 2500 ohm-farads. The dissipation factor is less than about 2% at 1.0 volt rms, and is typically about 1.8%. At 0.5 volts rms, the dissipation factor is typically about 1.2%. The dielectric withstanding voltage (DWV) of the dielectric ceramic composition is between about 480 V/mil and about 540 V/mil on one mil fired ceramic, with a typical DWV of about 500 V/mil.

Of particular importance is the high dielectric constant of the ceramic composition of the invention, and the fact that it varies predictably with temperature. As stated above, the dielectric constant of the ceramic composition is between about 4800 and about 5800, with a typical value of about 5400. In a desirable dielectric ceramic composition for use in multilayer capacitors, the temperature coefficient of capacitance is such that the dielectric constant does not alter from its base value at 25° C. by increasing more than 22% nor decreasing more than 56% in the temperature range between −30° C. and 85° C. This value also represents a specification in the ceramics industry known as the Y5U temperature characteristic. In the dielectric ceramic composition of the present invention, the temperature coefficient of capacitance decreases about 48% as the temperature decreases from 25° C. to −30° C. and decreases about 54% as the temperature increases from 25° C. to 85° C. Thus, the composition of the invention surpasses the industry Y5U requirement.

The invention will be further illustrated by the following examples, but the invention is not intended to be limited thereto.

EXAMPLE 1

A base ceramic preparation was prepared by mixing 1,506.7 grams TAM TICON COF grade barium titanate, 253.3 grams TAM TICON strontium titanate, 240.0 grams TAM TICON barium zirconate, 12.0 grams TAM TICON titanium dioxide-H.G., and 16.5 grams of 50 weight percent aqueous solution of manganous nitrate with 1283 grams distilled water for 30 minutes in a dispersion mixer. The resultant slurry was dried and pulverized. A glass frit powder was prepared by mixing 7.4 grams zinc oxide, 7.9 grams silicon dioxide, 24.3 grams boric acid, 39.5 grams lead oxide, 15.8 grams bismuth trioxide, and 15.8 grams cadmium oxide. The mixture was melted, fritted in cold water, and pulverized. 19.1 grams of the pulverized powder of the base ceramic preparation was dry blended with 0.9 grams of the glass powder. The blended powders were placed in a mortar and 1.0 grams of 5 weight % solution of poly-vinyl alcohol in distilled water was added. The mixture was pestled for approximately 5 minutes and granulated through a 40 mesh screen. Discs 1.27 centimeters in diameter and 0.15 centimeters thick were pressed at a pressure of 700 kilograms per square centimeter. The discs were placed on a stabilized zirconia setter and fired at a temperature of 1093° C. for 2 hours. After cooling, silver electrodes were painted on the discs, and they were fired at 850° C. in order to sinter on the electrodes. The dielectric constant of a typical disc was 3838. The Curie temperature was 20° C. and the dissipation factor was 0.6%.

EXAMPLE 2

A base ceramic preparation, prepared as set forth in Example 1 above, was heat treated at 940° C. for 2 hours. The soft resulting aggolamerate was pulverized in a laboratory micropulverizer. 955 grams of the base ceramic preparation was dry blended with 45 grams of glass frit prepared as set forth in Example 1 above. 480 grams of the resulting powder was blended with 4.8 grams of Nuodex V1444 surfactant, 13.3 grams of di-octyl phthalate, 68.4 grams of toluene, 17.1 grams of ethanol, and 23.5 grams of Butvar B-76 vinyl resin dissolved in 94 grams of toluene. The resulting mixture was placed in a pebble mill with one-half inch alumina media, and milled for 16 hours. The slurry, having a viscosity of 3000 centipoise, was filtered through a 44 micron screen, vacuum de-aired, and cast into a tape having a thickness of 1.4 mils. The tape was converted into multilayer ceramic capacitors consisting of 19 active capacitor layers with 70% silver—30% palladium electrodes. The capacitors were preheated to 260° C. for 48 hours, placed on stabilized zirconia setters, and fired at 1093° C. for 2 hours. Electrodes of DuPont silver paint #4822 were applied at opposite ends of the multilayer capacitors to connect alternate layers and were matured at 815° C. in a tunnel furnace. The dielectric constant of the resulting capacitors was $4924 \pm 127$, with a dissipation factor of $2.33 \pm 32\%$. The temperature coefficient of capacitance was $-35.2\%$ at $-35°$ C. and $-52\%$ at 85° C.

EXAMPLE 3

A batch of base ceramic preparation was prepared by mixing 1506 grams of TAM TICON COF 70 barium titanate, 253.3 grams of TAM TICON strontium titanate, 240.0 grams of TAM TICON barium zirconate, 12.0 grams of pigment grade anatase titanium dioxide, 16.5 grams of 50 weight percent aqueous solution (reagent grade) of manganeous nitrate, 1283 grams of deionized water, and 20 grams of the surfactant Darvan C, for 3 hours in a high shear mixer. The slurry was dried and pulverized. The resultant powder was heat treated at about 927° C. for 2 hours. The resulting soft powder was pulverized to an average particle size of 1.4 microns effective diameter, and a surface area of 2.9 square meters/gram. 475 grams of the base ceramic preparation powder was dry mixed in a mortar and pestle for 15 minutes with 25 grams of the glass frit powder prepared as described in Example 1. 480 grams of the mixed powders were blended with 4.8 grams of Nuodex V1444 surfactant, 13.3 grams of di-octoyl phthalate, 68.4 grams of toluene, 17.1 grams of ethanol, and 23.5 grams of Butvar B-76 vinyl resin dissolved in 94 grams of toluene. The material was put in a pebble mill with one-half inch alumina media and milled for 16 hours. This slurry was filtered through a 325 mesh filter, de-aired, and cast on a glass plate to obtain a dried green film 1.4 mils thick. Multilayer ceramic capacitors were made from this film by the method described above in Example 2. The capacitors were heat treated at 260° C. for 48 hours to remove the organic materials and fired to maturity at a temperature of about 1110° C. for 120 minutes. The multilayer ceramic capacitors were measured and found to have dielectric constants of $5399 \pm 179$, dissipation factors of $1.71 \pm 0.18\%$, and temperature coefficients of capacitance of $-55.9\%$ at 85° C. and $-40.2\%$ at $-35°$ C. The thickness of each ceramic layer of the multilayer ceramic capacitors was about 0.00261 centimeters, and the active electrode area was about 0.0926 square centimeters. The median capacitance was 322,100 picofarads. There were 19 active layers in each capacitor.

From the foregoing, it is evident that the present invention provides a novel dielectric ceramic composition, capable of being formed without a high temperature presintering step at temperatures below 1150° C., thus enabling the use of low cost silver—palladium electrodes in multilayer capacitor applications.

What is claimed is:

1. A dielectric ceramic composition formed from about 92 to about 96.5 percent by weight of a base ceramic preparation which base ceramic preparation consists essentially of from about 72 to about 80 weight percent barium titanate, from about 6 to about 15 weight percent strontium titanate, from about 6 to about 15 weight percent barium zirconate, from about 0.4 to about 0.8 weight percent titanium dioxide, and from about 0.1 to about 0.4 weight percent manganese dioxide, wherein the combined weight percent of strontium titanate and barium zirconate is from about 20 to about 28 percent by weight; and from about 3.5 to about 8 percent by weight of a glass frit which consists essentially of from about 5 to about 10 weight percent zinc oxide, from about 5 to about 10 weight percent silicon dioxide, from about 9 to about 15 percent boron oxide, from about 35 to about 45 weight percent lead oxide, from about 15 to about 25 percent bismuth trioxide, and from about 10 to about 19 weight percent cadmium oxide.

2. A dielectric ceramic composition formed by sintering at a temperature between about 1000° C. and about 1150° C. a mixture of (a) about 92 to about 96.5 weight percent of a base ceramic composition consisting essentially of metal oxides or precursors thereof in proportions to provide, in the oxide form, from about 72 to about 80 weight percent barium titanate, from about 6 to about 15 weight percent strontium titanate, from about 6 to about 15 weight percent barium zirconate, from about 0.4 to about 0.8 weight percent titanium dioxide, and from about 0.1 to about 0.4 weight percent manganese dioxide, wherein the combined weight percent of strontium titanate and barium zirconate is from about 20 to about 28 percent by weight; and (b) from about 3.5 to about 8 weight percent of a glass frit consisting essentially of from about 5 to about 10 weight percent zinc oxide, from about 5 to about 10 weight percent silicon dioxide, from about 9 to about 15 weight percent boron oxide, from about 35 to about 45 percent lead oxide, from about 15 to about 25 weight percent bismuth trioxide, and from about 10 to about 19 weight percent cadmium oxide.

3. A dielectric ceramic composition in accordance with claim 2 wherein the base ceramic preparation consists essentially of from about 74 to about 76 weight percent barium titanate, from about 12 to about 13 weight percent strontium titanate, from about 11.5 to about 12.5 weight percent barium zirconate, from about 0.5 to about 0.7 weight percent titanium dioxide, and from about 0.1 to about to about 0.3 weight percent manganese dioxide; and the glass frit consists essentially of from about 7 to about 8 weight percent zinc oxide, from about 13 to about 14 weight percent boron oxide, from about 39 to about 40 weight percent lead oxide, from about 15.5 to about 16.5 weight percent bismuth, and from about 15.5 to about 16.5 weight percent cadmium oxide.

4. A dielectric ceramic composition in accordance with claim 2 wherein the base ceramic preparation consists essentially of about 74.5 weight percent barium titanate, about 12.7 weight percent strontium titanate, about 12.0 weight percent barium zirconate, about 0.6 weight percent titanium dioxide, and about 0.2 weight percent manganese dioxide; and the glass frit consists essentially of about 7.4 percent zinc oxide, about 7.9 weight percent silicon dioxide, about 13.6 weight percent boron oxide, about 39.5 weight percent lead oxide, about 15.8 weight percent bismuth trioxide, and about 15.8 weight percent cadmium oxide.

5. A dielectric ceramic composition in accordance with claim 3 wherein the base ceramic preparation consists essentially of about 93 percent to about 96 percent of the total weight of the dielectric ceramic composition and the glass frit consists essentially of about 4 percent to about 7 percent of the total weight of the dielectric ceramic composition.

6. A dielectric ceramic composition in accordance with claim 4 wherein the base ceramic preparation consists essentially of about 95.5 percent of the total weight of the dielectric ceramic composition, and the glass frit consists essentially of about 4.5 percent of the total weight of the dielectric ceramic composition.

7. A dielectric ceramic composition in accordance with claim 2 wherein the dielectric constant is greater than 5000.

8. A dielectric ceramic composition in accordance with claim 2 wherein the dielectric constant of the dielectric ceramic composition changes from its value at 25° C. by increasing less than 22 percent and decreasing less than 56 percent in the temperature range between −30° C. and 85° C.

9. A method of making a dielectric ceramic composition which comprises:
 (a) mixing a base ceramic preparation consisting essentially of metal oxides or precursors thereof in proportions to provide, in the oxide form, from about 72 to about 80 weight percent barium titanate, from about 6 to about 15 weight percent strontium titanate, from about 6 to about 15 weight percent barium zirconate, from about 0.4 to about 0.8 weight percent titanium dioxide, and from about 0.1 to about 0.4 weight percent manganese dioxide, wherein the combined weight percent of strontium titanate and barium zirconate is from about 20 to about 28 percent by weight;
 (b) milling said base ceramic preparation with a glass frit consisting essentially of from about 5 to about 10 weight percent zinc oxide, from about 5 to about 10 weight percent silicon dioxide, from about 9 to about 15 weight percent boron oxide, from about 35 to about 45 weight percent lead oxide, from about 15 to about 25 weight percent bismuth trioxide, and from about 15 to about 20 weight percent cadmium oxide; and
 (c) firing the mixture of said base ceramic preparation and said glass frit at a temperature between about 1000 degrees centigrade and about 1150 degrees centigrade.

10. A method in accordance with claim 9 wherein the base ceramic preparation consists essentially of metal oxides or precursors thereof in proportions to provide, in the oxide form, from about 74 to about 76 weight percent barium titanate, from about 12 to about 13 weight percent strontium titanate, from about 11.5 to about 12.5 weight percent barium zirconate, from about 0.5 to about 0.7 weight percent titanium dioxide and from about 0.1 to about 0.3 weight percent manganese dioxide; and the glass frit consists essentially of from about 7 to about 8 weight percent zinc oxide, from about 7.5 to about 8.5 weight percent silicon dioxide, from about 13 to about 14 weight percent boron oxide, from about 39 to about 40 weight percent lead oxide, from about 15.5 to about 16.5 weight percent bismuth trioxide, and from about 15.5 to about 16.5 weight percent cadmium oxide.

11. A method in accordance with claim 9 wherein the base ceramic preparation consists essentially of metal oxides or precursors thereof in proportions to provide, in the oxide form, about 74.5 weight percent barium titanate, about 12.7 weight percent strontium titanate, about 12.0 weight percent barium zirconate, about 0.6 weight percent titanium dioxide, and about 0.2 weight percent manganese dioxide; and the glass frit consists essentially of about 7.4 weight percent zinc oxide, about 7.9 weight percent silicon dioxide, about 13.6 weight percent boron oxide, about 39.5 weight percent lead oxide, about 15.8 weight percent bismuth trioxide, and about 15.8 weight percent cadmium oxide.

12. A method in accordance with claim 9 wherein the dielectric ceramic composition consists essentially of from about 92 to about 96.5 weight percent of the base ceramic preparation and from about 3.5 to about 8 weight percent of the glass frit.

13. A method in accordance with claim 10 wherein the dielectric ceramic composition consists essentially of from about 93 to about 96 weight percent of the base ceramic preparation and from about 4 to about 7 weight percent of the glass frit.

14. A method in accordance with claim 11 wherein the dielectric ceramic composition consists essentially of about 95.5 weight percent of the base ceramic preparation and about 4.5 weight percent of the glass frit.

* * * * *

UNITED STATES PATENT AND TRADEMARK OFFICE
CERTIFICATE OF CORRECTION

PATENT NO. : 4,335,216
DATED : June 15, 1982
INVENTOR(S) : Hodgkins, et al.

It is certified that error appears in the above—identified patent and that said Letters Patent is hereby corrected as shown below:

Column 7, line 34: After "2.33±" insert --.-- before "32%".

Signed and Sealed this

*Twenty-first* Day of *September 1982*

[SEAL]

*Attest:*

GERALD J. MOSSINGHOFF

*Attesting Officer*     *Commissioner of Patents and Trademarks*